US011507303B2

(12) United States Patent
Sharma et al.

(10) Patent No.: US 11,507,303 B2
(45) Date of Patent: Nov. 22, 2022

(54) USER CONTROLLED DATA-IN FOR LOWER AND MIDDLE PAGE IN MLC-FINE QLC MEMORIES

(71) Applicant: WESTERN DIGITAL TECHNOLOGIES, INC., San Jose, CA (US)

(72) Inventors: Amit Sharma, Karnataka (IN); Sourabh Sankule, Karnataka (IN); Dinesh Kumar Agarwal, Karnataka (IN); Chetan Agrawal, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/236,704

(22) Filed: Apr. 21, 2021

(65) Prior Publication Data

US 2022/0342585 A1  Oct. 27, 2022

(51) Int. Cl.
*G06F 3/06*  (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 10,650,896 B1 | 5/2020 | Yang | |
| 10,705,966 B1 | 7/2020 | Rub et al. | |
| 10,734,071 B2* | 8/2020 | El Gamal | G11C 11/5628 |
| 2016/0099057 A1* | 4/2016 | Dusija | G11C 16/3459 |
| | | | 365/185.11 |
| 2018/0024779 A1* | 1/2018 | Kojima | G06F 12/109 |
| | | | 711/103 |
| 2019/0317691 A1* | 10/2019 | Kanno | G06F 12/0246 |
| 2019/0332316 A1* | 10/2019 | Kanno | G06F 3/0679 |
| 2020/0089430 A1* | 3/2020 | Kanno | G06F 3/0679 |
| 2020/0194078 A1* | 6/2020 | Kondo | G11C 16/10 |
| 2020/0286562 A1 | 9/2020 | Gorobets et al. | |
| 2020/0327933 A1 | 10/2020 | El Gamal et al. | |
| 2021/0082497 A1* | 3/2021 | Hara | G11C 11/5628 |
| 2021/0158867 A1* | 5/2021 | Hara | G06F 3/0619 |
| 2022/0076753 A1* | 3/2022 | Sharma | G11C 11/5628 |
| 2022/0215873 A1* | 7/2022 | Islam | G11C 16/0483 |

* cited by examiner

*Primary Examiner* — Sean D Rossiter
(74) *Attorney, Agent, or Firm* — ArentFox Schiff LLP

(57) ABSTRACT

Aspects of a storage device including a memory and a controller are provided. The memory includes non-volatile memory and volatile memory. The controller may determine whether first data is available at a system-level memory location during a first programming stage of a two-stage programming sequence. The controller may read the first data from the system-level memory location when the page data is available at the system-level memory location. Alternatively, the controller may read the first data from the non-volatile memory when the page data is not available at the system-level memory location. Thus, the controller may perform a first programming operation associated with the first programming stage using the first data, thereby improving memory programming performance of the storage device.

20 Claims, 10 Drawing Sheets

700

| WL # | Program Stage | Program Order | | | |
|---|---|---|---|---|---|
| | | String 0 | String 1 | String 2 | String 3 |
| WL 0 | Foggy | 0 | 1 | 2 | 3 |
| | Fine | 5 | 7 | 9 | 11 |
| WL 1 | Foggy | 4 | 6 | 8 | 10 |
| | Fine | 13 | 15 | 17 | 19 |
| WL 2 | Foggy | 12 | 14 | 16 | 18 |
| | Fine | 21 | 23 | 25 | 27 |
| WL 3 | Foggy | 20 | 22 | 24 | 26 |
| ... | ... | ... | ... | ... | ... |
| WL 93 | Fine | 749 | 751 | 753 | 755 |
| WL 94 | Foggy | 748 | 750 | 752 | 754 |
| | Fine | 757 | 759 | 761 | 763 |
| WL 95 | Foggy | 756 | 758 | 760 | 762 |
| | Fine | 764 | 765 | 766 | 767 |

FIG. 7

USER CONTROLLED DATA-IN FOR LOWER AND MIDDLE PAGE IN MLC-FINE QLC MEMORIES

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of Not-And (NAND) flash memory cells on one or more dies. Flash memory may be found in solid-state devices (SSDs), Secure Digital (SD) cards, Universal Serial Bus (USB) cards, and the like.

The growing demand for high capacity storage devices has catalyzed the use of multi-level NAND flash memory cells, which include multi-level cells (MLC, 2 bits per cell), triple-level cells (TLC, 3 bits per cell), quad-level cells (QLC, 4 bits per cell), and higher capacities. As the number of bits stored in a memory cell increases, the level of precision required for reliable data programming also becomes stricter in tandem. Existing approaches for precise programming of multi-level NAND flash memory cells may demand additional hardware resources, which increases the complexity and cost of the storage device while reducing available space for other productive uses. Thus, there is a need for a more efficient method of programming multi-level NAND flash memory cells.

SUMMARY

One aspect of a storage device is disclosed herein. The storage device includes a memory and a controller. The memory includes non-volatile memory and volatile memory. The controller is configured to determine whether first data is available at a system-level memory location during a first programming stage of a two-stage programming sequence. The controller is further configured to read the first data from the system-level memory location when the page data is available at the system-level memory location. The controller is further configured to read the first data from the non-volatile memory when the page data is not available at the system-level memory location. The controller is further configured to perform a first programming operation associated with the first programming stage using the first data.

Another aspect of a storage device is disclosed herein. The storage device includes a memory and a controller. The memory includes non-volatile memory and volatile memory. The controller is configured to transition into a first programming stage of a two-stage programming sequence from a second programming stage of the two-stage programming sequence. The controller is further configured to determine whether first data is available at a system-level memory location during the first programming stage. The controller is further configured to read the first data from the system-level memory location when the page data is available at the system-level memory location. The controller is further configured to read the first data from the non-volatile memory when the page data is not available at the system-level memory location. The controller is further configured to perform a first programming operation associated with the first programming stage using the first data.

A further aspect of a storage device is disclosed herein. The storage device includes a memory and a controller. The memory includes non-volatile memory and volatile memory. The controller is configured to transition into a first programming stage of a two-stage programming sequence from a second programming stage of the two-stage programming sequence. The controller is further configured to determine whether first data is available at a system-level memory location during the first programming stage. The controller is further configured to read the first data from the system-level memory location when the page data is available at the system-level memory location. The controller is further configured to send a command prefix indicating that the first data is being supplied from the system-level memory location as part of the first programming operation. The controller is further configured to perform a first programming operation associated with the first programming stage using the first data.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 7 is a conceptual diagram illustrating an example of a programming order for writing data to a block using a two-stage programming sequence, as performed by the storage device of FIG. 1.

DETAILED DESCRIPTION

Figure 1:
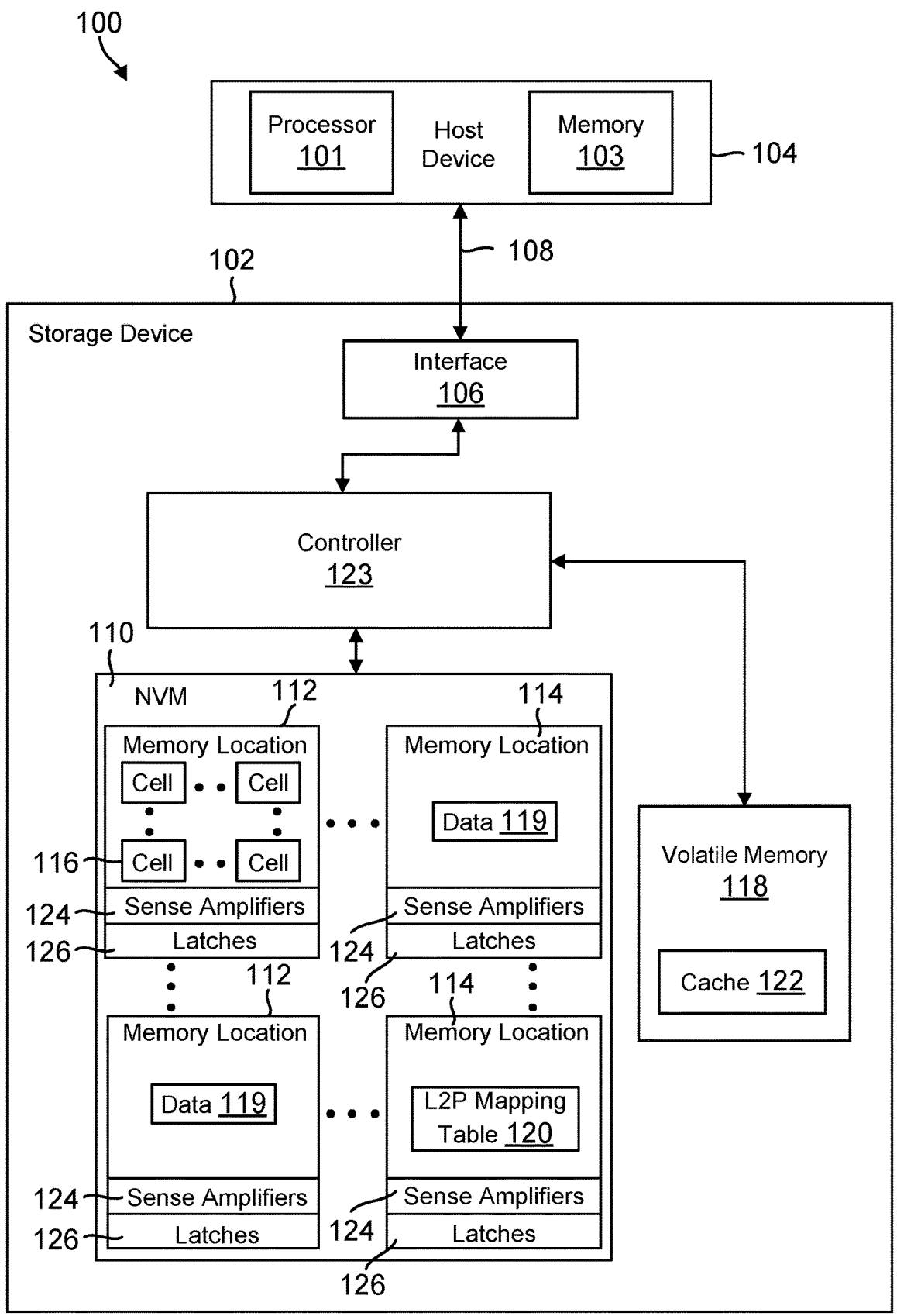
FIG. 1 is a block diagram illustrating an exemplary embodiment of a storage device in communication with a host device.

One approach to provide the required programming precision for multi-level cells is to use a foggy-fine programming approach. For example, when programming QLC memory cells, a first foggy phase may coarsely program four bits of data for each memory cell into wide overlapping distributions that are below target voltages, whereas a second fine phase may precisely program the same four bits of data for each memory cell to extend into narrower distributions containing the target voltages.

QLC memory cells utilize a foggy-fine programming sequence to achieve better threshold voltage distributions over legacy programming sequences, hence lowering the Block Error Rate (BER). A fine programming operation on a word line may only be attempted when a foggy programming operation on a next word line has been completed. Foggy state data may not be readable, hence host data of all four pages (e.g., Lower page, Middle page, Upper page and Top page) are needed to start a fine programming operation. Next generation of Bit Cost Scalable (BiCS) memory cells may include four planes (e.g., each of 16 KB data storage) and five strings. This increases write buffer requirements and significantly adds DRAM cost for direct write platforms.

To decrease the write buffer requirements, a novel two-step programming sequence (MLC-Fine programming sequence) is provided for programming QLC memory cells. Flash memory cells can be programmed with MLC-Fine programming sequence using the same foggy-fine programming order as utilized in legacy programming sequences for QLC NAND programming. To start the MLC programming operation in the MLC-Fine programming sequence, only two pages of data (e.g., lower and middle pages) may be required. In contrast, the legacy programming sequences in QLC NAND memory cells requires all four pages to start the foggy programming operation. In the MLC-Fine programming sequence, the lower and middle pages of data become readable after completion of the MLC programming stage. The lower and middle page data can be either stored in SLC blocks (e.g., folding architectures) or in volatile memory (e.g., RAM). During the fine programming stage, the memory controller can perform internal read of lower and middle pages, whereas the storage system may need to only provide two pages of data (e.g., upper and top pages) to start the fine programming operation. As such, the MLC-Fine programming sequence can significantly reduce the write buffer requirements.

In particular, the present disclosure provides for a novel programming technique in NAND flash memory cells that enables an implicit disablement of a data load operation (or a sense operation) of lower and middle page data during a fine programming stage in MLC-Fine QLC memory cells. For example, the subject technology provides for dual user control in MLC-Fine QLC memory cells to select either a NAND internal sense operation of lower and middle page data during a fine programming stage or system-supplied data for lower and middle page data at the fine programming stage such that the NAND internal sense operation would not be attempted to perform an internal read of lower and middle page data. In some aspects, a command prefix can be added to the two-stage programming sequence while initiating the fine programming stage in NAND flash memory cells. The command prefix can enable or disable internal sensing of lower and middle pages, although the command prefix is one of multiple methods to indicate either to enable or to disable internal NAND sensing. In the event that lower and middle page data is available in a system-level storage location during a fine programming stage, the internal sense operation of the lower and middle pages can be disabled via the command prefix and instead page data may be toggled in from the system-level storage location. In this regard, the MLC-Fine programming sequence of the subject technology can improve the overall performance of storage devices by reducing the write buffer requirements at the storage controller and reducing BER during the fine programming stage by facilitating system-supplied data in lieu of NAND internal sense operations.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

FIG. 1 shows an exemplary block diagram 100 of a storage device 102 which communicates with a host device 104 (also "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magneto-resistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

In some aspects, a portion of the host memory 103 may be used for a host memory buffer (HMB). The HMB may be a buffer that is allocated by the host device 104 for use of the memory controller 123. In some exemplary embodiments, the HMB is for exclusive usage of the memory controller 123. For example, the memory controller 123 may use the HMB to cache data. The host device 104 may guarantee that the data in the HMB can be valid and is obliged to notify the memory controller 123 before any operation that may cause data loss (e.g., power loss, host may need this buffer, etc., . . . ), in one exemplary embodiment. The host device 104 allows the memory controller 123 to acknowledge this operation before the data is lost, in one exemplary embodiment. In one exemplary embodiment, the host device 104 can perform an initial allocation of the HMB to the memory controller 123 when the memory controller 123 is initialized. The memory controller 123 is initialized when the storage device 102 is powered on, in one exemplary embodiment. The initial allocation may be compliant with NVMe; however, the initial allocation of HMB is not limited to NVMe.

The HMB may be used to store management tables. In one exemplary embodiment, the management tables include L2P tables (logical to physical mappings) and P2L tables (physical to logical mappings). The memory controller 123 can use the management tables to map logical addresses (LAs) to physical addresses (PAs). Such management tables can be used to directly map LAs to the PAs, or LAs can be mapped to intermediate or virtual addresses, which are mapped to PAs. In some exemplary embodiments, the logical addresses are logical block addresses, and the physical addresses are physical block addresses. Other variations are also possible.

The management tables may also be used to manage caching of data in locations other than in the non-volatile memory 110. In one exemplary embodiment, the memory controller 123 caches data in the HMB. For example, the memory controller 123 may use the HMB to cache data that is associated with some LAs (or range of LAs). The management tables may also be used to manage caching of data in the HMB. In one exemplary embodiment, the memory controller 123 caches data in the volatile memory 118. For example, the memory controller 123 may use the volatile memory 118 to cache data that is associated with some LAs (or range of LAs). The management tables may also be used to manage caching of data in the volatile memory 118. The volatile memory 118 is volatile memory, in one exemplary embodiment.

The host interface 106 is configured to interface the storage device 102 with the host device 104 via a bus/network 108, and may interface using, for example, Ethernet or WiFi, or a bus standard such as Serial Advanced Technology Attachment (BATA), PCI express (PCIe), Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra-Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies. Non-volatile Memory Express (NVMe) is a logical device interface specification for accessing non-volatile storage attached via a PCIe bus. NVMe takes advantage of parallelism offered by semiconductor memory such as, but not limited to, SSDs.

The storage device 102 includes a memory. For example, in the exemplary embodiment of FIG. 1, the storage device 102 may include a non-volatile memory (NVM) 110 for persistent storage of data received from the host device 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
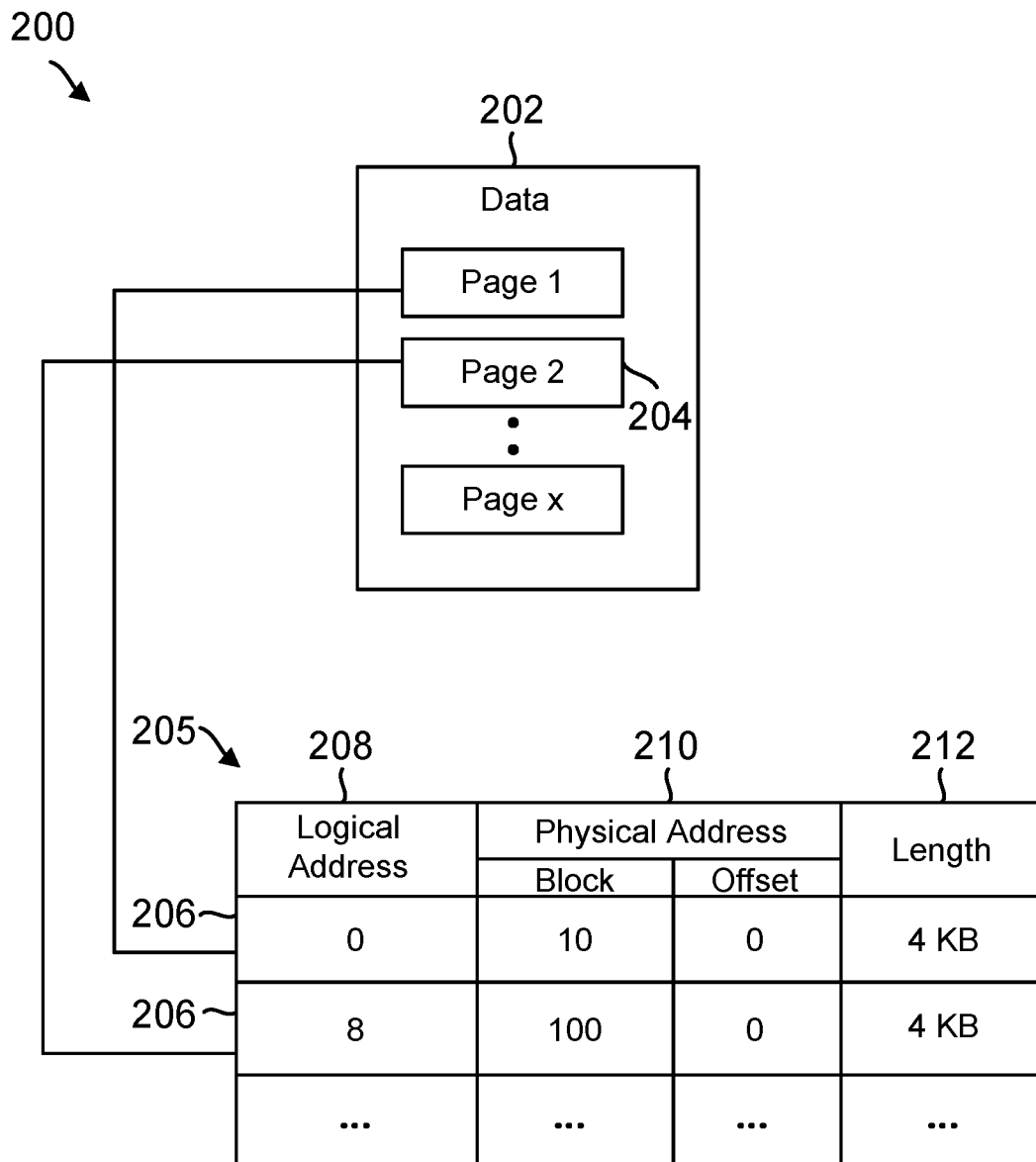
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an ASIC, a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The host interface 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host device 104 may retrieve data from the storage device 102 by sending a read command specifying one or more logical addresses associated with the data to be retrieved from the storage device 102, as well as a length of the data to be read. The host interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host device 104 via the host interface 106.

Figure 3:
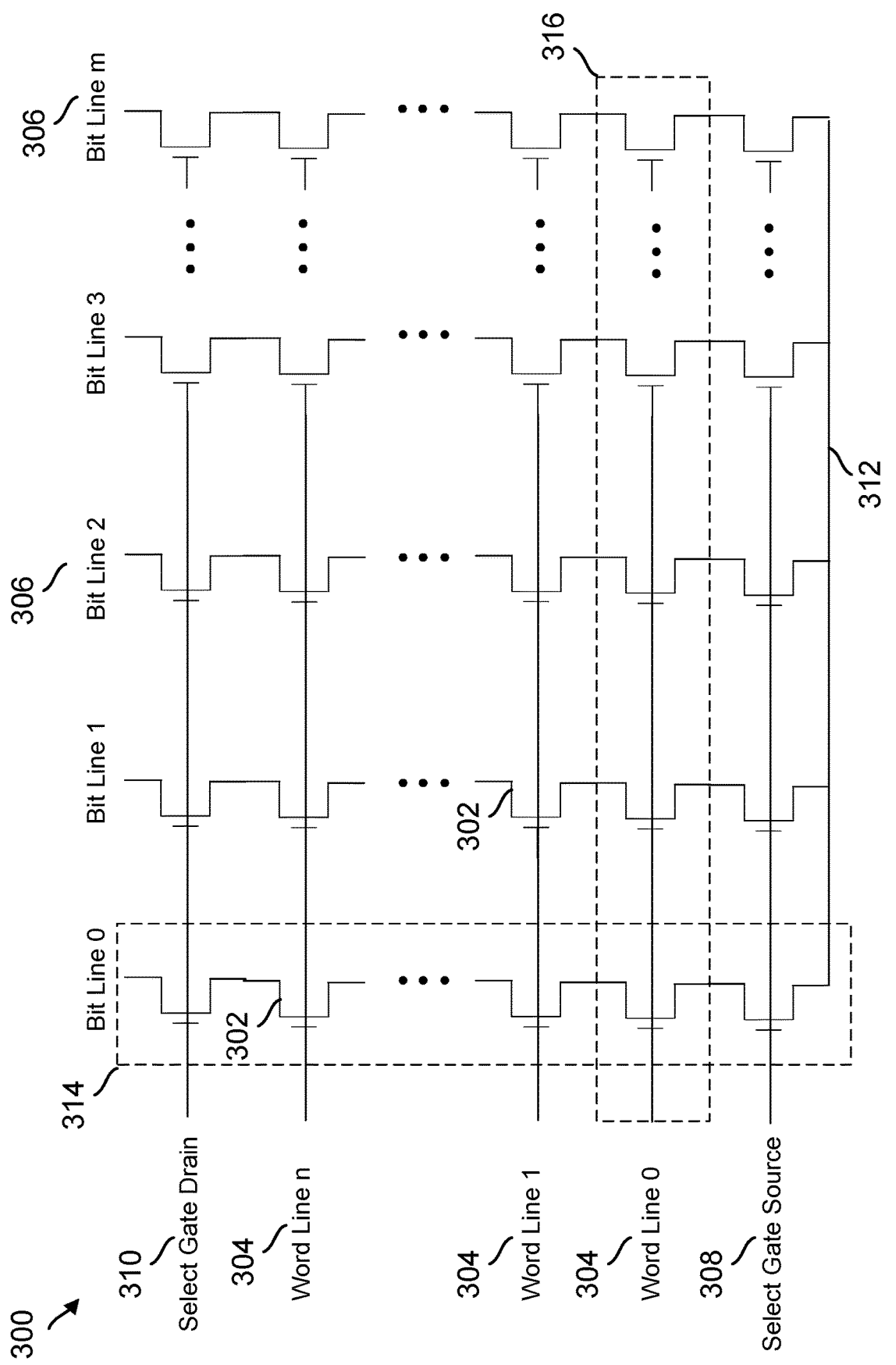
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SOS and SGD cells 308, 310) coupled to one bit line within a block, while a page 316 may include a group of cells 302 coupled to one word line within the block.

Figure 4:
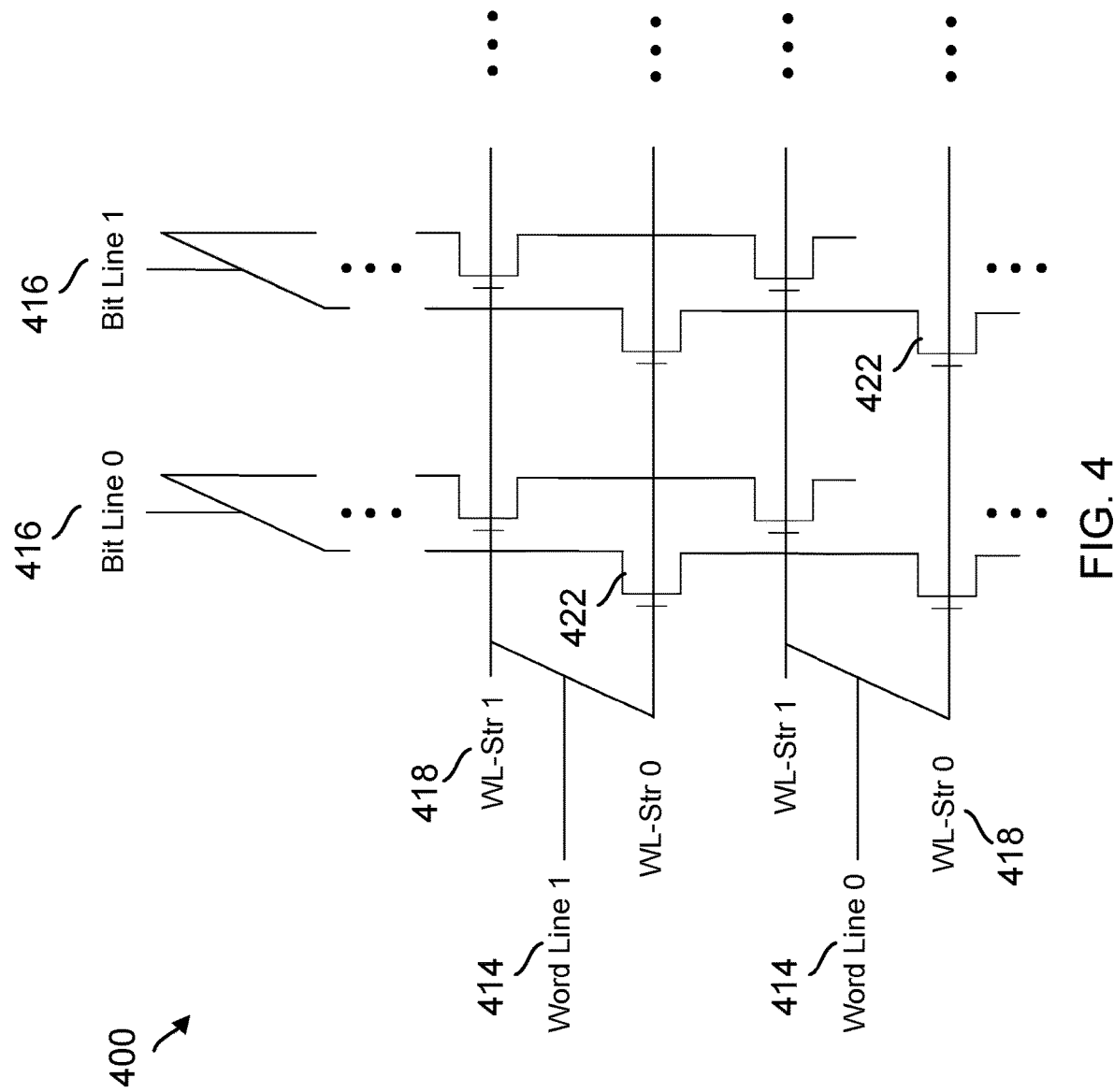
FIG. 4 is a conceptual diagram illustrating an example of a three dimensional array of memory cells in the storage device of FIG. 1.

FIG. 4 illustrates an example of a three-dimensional (3D) NAND memory array 400 of cells 422. Cells 422 may correspond to cells 116 in the NVM 110 of FIG. 1. As in the 2D memory array 300 of FIG. 3, multiple cells 422 may be coupled to word lines 414 and bit lines 416. However, in the 3D memory array 400, the word lines 414 may each include multiple word line strings 418, and the bit lines 416 may be connected to each of the word line strings 418. Similarly, SGS cells and SGD cells (not shown) may respectively connect the memory cells in each word line string 418 to the source line (not shown) and bit lines 416. Thus, 3D memory array 400 may store more individually accessible pages of data on each word line 414 (e.g. in word line strings 418) than 2D memory array 300. While the 3D memory array 400 illustrated in FIG. 4 includes an example of two word line strings 418 for each word line 414, the word lines 414 may include other numbers of word line strings (e.g. four WL-Strs 0-3) in other examples. The architecture of FIG. 4, or variations thereof, may be used in 3D NAND implementations including Bit Cost Scalable (BiCS) flash memory for ultra-high density storage devices.

Figure 5:
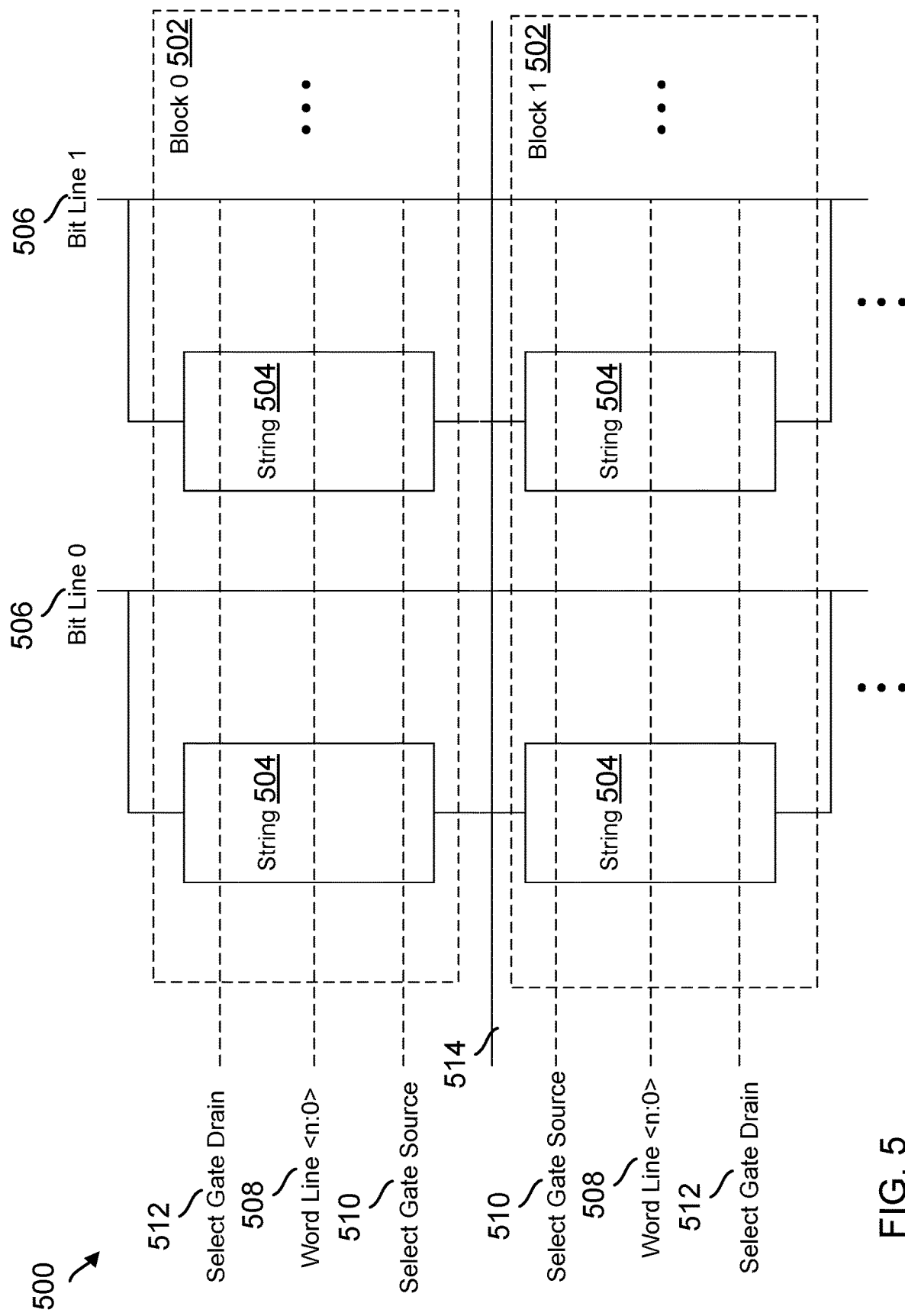
FIG. 5 is a conceptual diagram illustrating an example of an array of blocks in the storage device of FIG. 1.

FIG. 5 illustrates an example of a NAND memory array 500 of blocks 502 including multiple strings 504. Blocks 502 may correspond to blocks of a die 114 in the NVM 110 of FIG. 1, and strings 504 may each correspond to string 314 in FIG. 3. As in the memory array 300 of FIG. 3, each string 504 may include a group of memory cells each coupled to a bit line 506 and individually coupled to respective word lines 508. Similarly, each string may include a SGS cell 510 and SGD cell 512 which respectively connects the memory cells in each string 504 to a source line 514 and bit line 506.

When the controller 123 reads data from or writes data to a page 316 of cells 302 (i.e. on a word line 304, 508), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 508 until the cell reaches the threshold voltage, and during an erase operation, the controller may send a command to apply an erase voltage to the block 502 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 508 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 508 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 508 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 6:
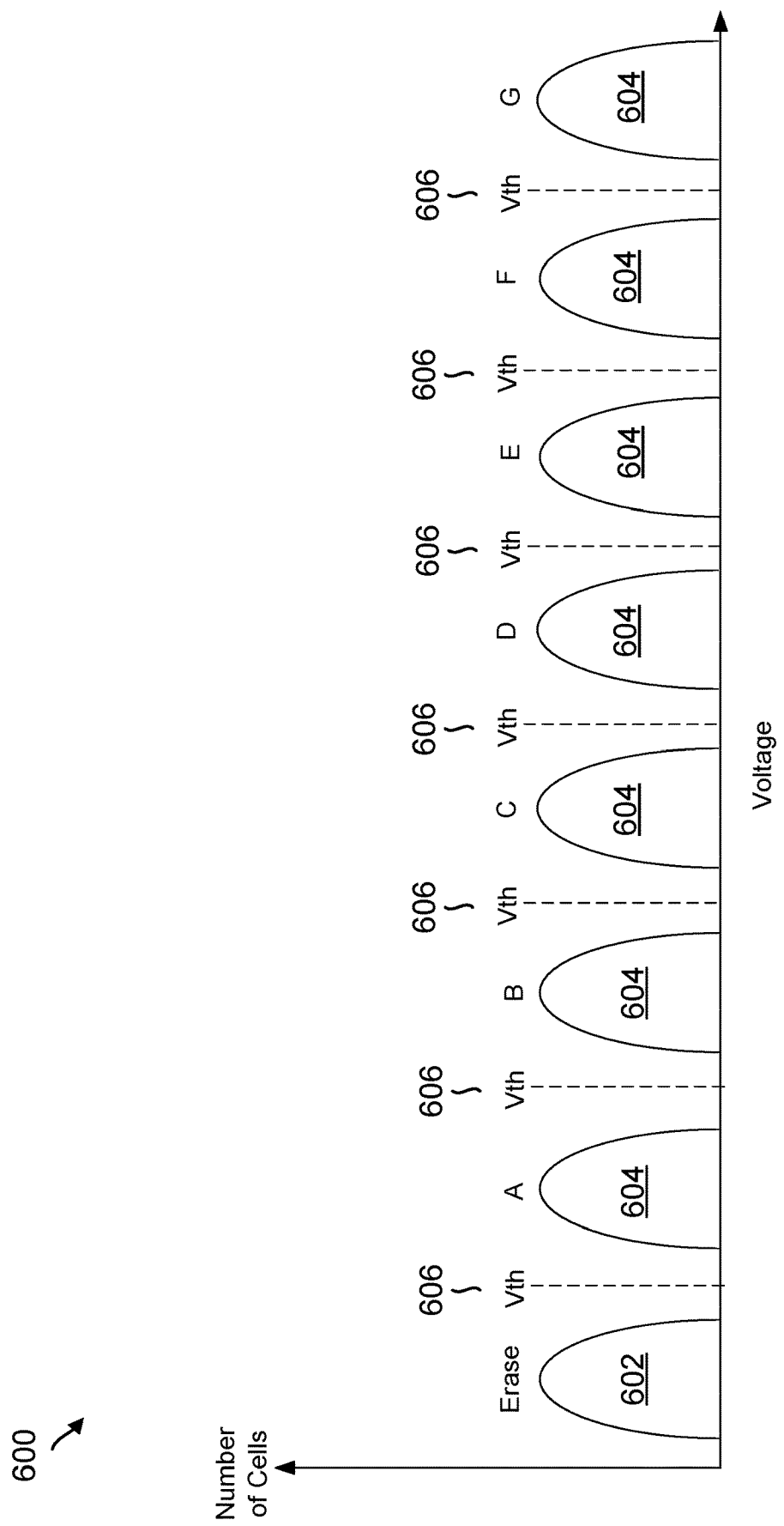
FIG. 6 is a graphical diagram illustrating an example of a voltage distribution chart for triple-level cells in the storage device of FIG. 1.

FIG. 6 illustrates an example of a voltage distribution chart 600 illustrating different NAND states for TLCs (e.g. cells 116, 302) storing three bits of data (e.g. logic 000, 001, etc. up to logic 111), The TLCs may include an erase state 602 corresponding to logic '111' and multiple program states 604 (e.g. A-G) corresponding to other logic values '000-110'. The program states 604 may be separated by different threshold voltages 606. Initially, the cells 116, 302 may be in the erase state 602, e.g. after the controller 123 erases a block 502 including the cells. When the controller 123 program LPs, MPs, and UPs as described above, the voltages of the cells 116, 302 may be increased until the threshold voltages 606 corresponding to the logic values to be stored are met, at which point the cells transition to their respective program states 604. While FIG. 6 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 508 into one of the program states 604, the controller may perform incremental step pulse programming (ISPP) over a number of programming loops or ISPP cycles. For example, a programming voltage (e.g. a high voltage) may be applied to the selected word line 304, 508, a pass through voltage (e.g. a high voltage lower than the programming voltage) may be applied to the other word lines 304, 508, a bit line program voltage (e.g. a low voltage) may be applied on the bit lines 306, 506 connected to the selected cells being programmed on the selected word line, and a bit line inhibit voltage (e.g. a high voltage) may be applied on the bit lines 306, 506 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 508 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

FIG. 7 is a conceptual diagram illustrating an example of a programming order for writing data to a block 700 using a two-stage programming sequence, as performed by the storage device of FIG. 1. The block 700 may be a block of memory in a NAND die. There are multiple word lines in a memory and there are multiple string lines. For example, the block 700 includes 96 word lines (depicted as "WL0" to "WL95") and four string lines (depicted as "String 0, String 1, String 2, String 3) per word line. For example, there are four strings acting as layers on the same word line. Each string, depending on the number of bits being stored, can have multiple cells. The string may be representative of a physical entity. For example, the string size can be 16 KB if the memory is a one-plane memory. In another example, the string size can be 64 KB if the memory is a four-plane memory. In present generations of memory, the memory plane size is 64 KB. For QLC memory, one page size is 64 KB if used as SLC mode since one bit can be stored per SLC cell. Alternatively, if the QLC memory is used in QLC mode, 64 KB of data can be stored into four pages with each page containing 16 KB because four bits can be stored per QLC cell.

Because these memories may be tightly packed, it is a challenge to acquire a proper error distribution that minimizes the number of errors that is introduced into NAND phenomenon. In NAND designs, there are two implications. In the first implication, a particular NAND cell with multiple bits may not be programmed after a one-phase programming. Rather, the programming of the particular NAND cell is attempted twice and completed after a two-stage programming, which can be referred to as foggy-fine programming. In this regard, the first stage is referred to as foggy programming and the second stage is referred to as fine programming. Until the fine programming is complete, the value programmed in existing memories during the foggy programming stage becomes readable. Prior to the foggy programming stage, the foggy programmed values may not be readable. If the memory cell is a QLC cell, then 4 bits per QLC cell can be read. As illustrated in FIG. 7, each word lines has two programming stages (e.g., foggy programming stage, fine programming stage).

In the second implication, in order to initiate the fine programming stage, all of the foggy programming steps at respective string lines along the same word line have to be completed. As illustrated in FIG. 7, word line 0 (depicted as "WL0") has four string lines (e.g., String 0, String 1, String 2, String 3), where the programming stage can transition into foggy programming to initiate the fine programming steps along word line 0. The foggy programming may proceed from the last string on word line 0 to a first string (e.g., String 0) on a next word line (e.g., world line 1 "WL1"), after which the programming stage transitions to fine programming at String 0 of word line 0 to initiate the fine programming stage. At the transition between word line 1 and word line 0 at string 0 may not require a significant amount of charge to facilitate the word line transition, such that the word line transition may not cause disturbances across the two cells. Following the fine programming step at string 0, word line 0, the programming stage transitions to perform foggy programming at string 1, word line 1, then the programming stage transitions to perform fine programming at string 1, word line 0, and so on.

When a storage operation is being performed near the end of the block, the foggy programming and fine programming transitions may be ordered differently than at the start of the block. For example, at world line 95 (depicted as "WL 95"), the fine programming stage is initiated prior to transitioning into the foggy programming stage.

To start foggy programming in QLC mode, all four bits per cell should be supplied and stored. A NAND block with QLC cells can have four planes for each string line, where each plane may include 16 KB of memory capacity for a total of 64 KB per string line. In a QLC cell, there may be four pages (e.g., lower page, middle page, upper page, top page), so 64 KB of data would be programmed to each of the four pages to start the foggy programming stage at a string line. For example, the first string line at word line 0 (e.g., String 0, WL0) would require all four bits of data to start the foggy programming stage. During the fine programming at String 0, word line 0, the four bits of data would be needed to be provided to the NAND cell. In this regard, the NAND cell would be fine programmed using the four bits of data programmed during the foggy programming stage.

If data is being received from a host device, and the foggy programming is to begin at string 0 at word line 0, the received data has to be stored at a specified location in memory as the data cannot be read during the foggy programming stage as it is a partially programmed stage. In this regard, the NAND cell would have readable data until after the completion of the fine programming stage. In this regard, after the completion of the foggy programming stage at string 0, word line 0 (e.g, programming step 0), the data cannot be read. Similarly, the data may not be read after completion of the foggy programming stage at strings 1-4 (e.g., programming steps 0-4). However, the data may be read from RAM after completion of the fine programming stage at String 0, word line 0 (e.g., programming step 5). In this regard, the amount of volatile memory required per die in foggy-fine programming can be expressed as:

$$\text{Memory\_Size}_{plane} * N_{planes} * N_{pages} * N_{strings} = \text{Foggy\_Fine\_Memory}_{per\ die},$$

where $N_{planes}$ refers to the number of planes in a die, $N_{pages}$ refers to the number of pages in a die, and $N_{strings}$ refers to the number of strings in a die. For example, as illustrated in FIG. 7, the RAM required per die in the foggy-fine programming is 16 KB per plane*4 planes*4 pages*6 strings=1.5 MB. In a storage system, there can be multiple dies (e.g., 16, 32, 64). In this regard, if a system includes 32 dies and each die requires 1.5 MB of RAM to support the foggy-fine programming, then the total RAM required for a system to hold the data temporarily may be about 48 MB of RAM, which is a significantly high amount of RAM required in terms of storage device controller RAM capacities.

In some approaches, the foggy-fine programming may be performed with an on-chip copy (OCC) programming method, where all host data is copied first to SLC blocks in NAND memory. In this regard, the host data will reside in the SLC blocks. While programming to a QLC block, data (e.g., four pages of data) can be sensed from an SLC block and provided to QLC. During the foggy programming stage, the memory controller senses data from an SLC block to a foggy programming step (e.g., step 0 at string line 0, word line 0). This sub-process can be completed for each of the foggy programming steps 1-4. At the fine programming step (e.g., step 5 at string 0, word line 0), data also can be sensed from the SLC block to perform fine programming, With the OCC programming method, the amount of RAM required is less compared to the aforementioned approach. However, the OCC programming method has a drawback in terms of the number of data programs for the same host data. For example, a first data program of host data to SLC cells and a second data program of host data to QLC cells. Although the OCC programming method provides an advantage in terms of RAM capacity savings, the OCC programming method may suffer in terms of speed and performance.

Figure 8:
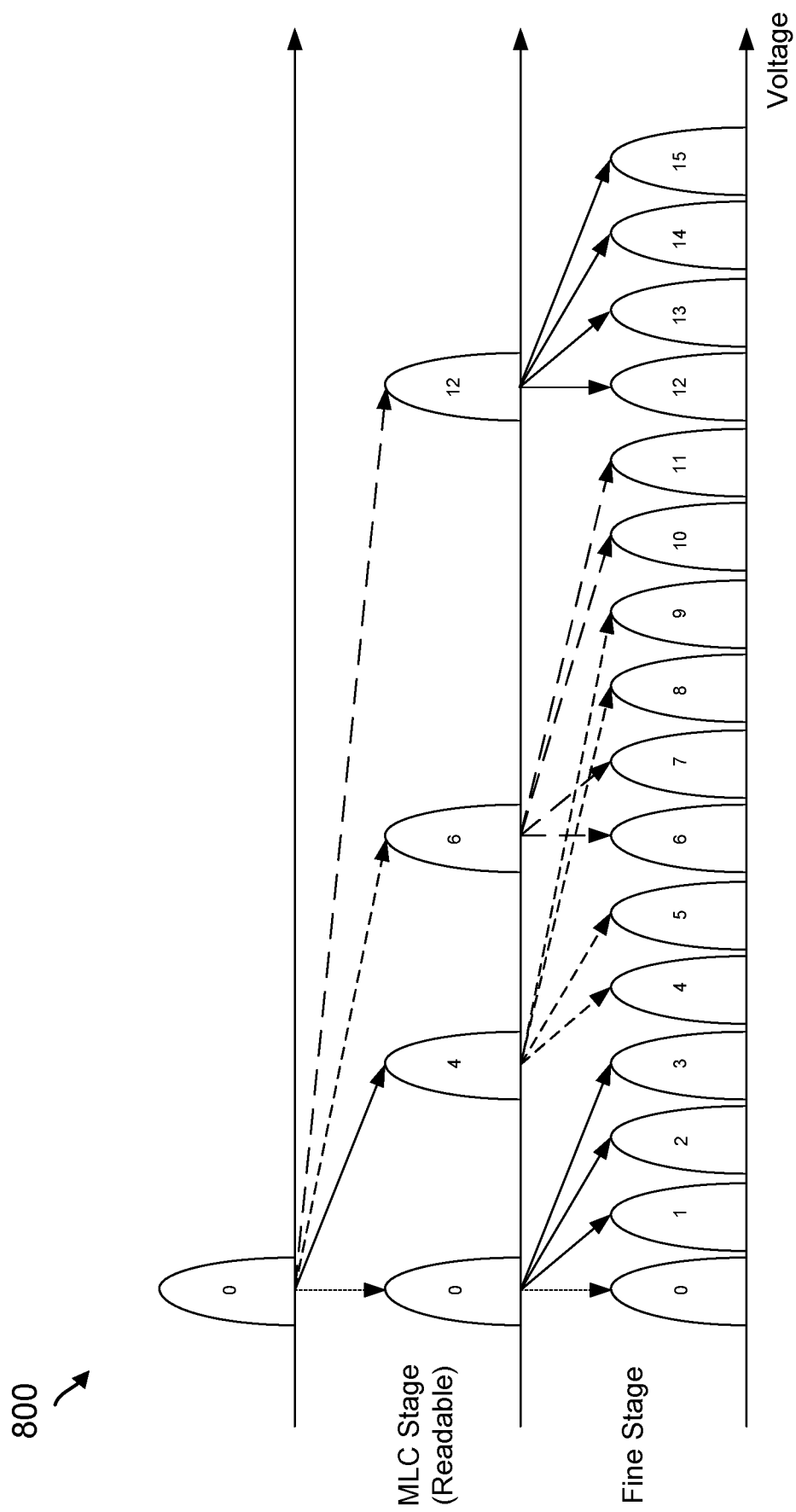
FIG. 8 is a conceptual diagram illustrating an example of a programming operation for writing data to a block using an MLC-fine programming sequence, as performed by the storage device of FIG. 1.

FIG. 8 is a conceptual diagram 800 illustrating an example of a programming operation for writing data to a block using an MLC-fine programming sequence, as performed by the storage device 102 of FIG. 1. The diagram 800 illustrates different NAND states for QLCs (e.g. cells 116, 302) storing four bits of data (e.g. logic 0000, 0001, etc. up to logic 1111), The QLCs may include an erase state (denoted as "0") corresponding to logic '1111' and multiple program states (e.g. 1-15) corresponding to other logic values '0100-1110'. The program states may be separated by different threshold voltages. Initially, the cells 116, 302 may be in the erase state, e.g. after the controller 123 erases a block 502 including the cells.

To reduce the size of write buffers required during foggy-fine programming, the subject technology provides for a novel mechanism that includes a MLC-fine programming mode for programming QLC memories. In this regard, a MLC write sub-process can be undertaken to start the foggy programming stage. The MLC write sub-process can be referred to as a MLC programming stage, To start the MLC programming stage (e.g., programming step 1), only two pages of data (e.g., lower page and middle page) are required. In contrast, the traditional QLC NAND requires all four pages (e.g., lower page, middle page, upper page, top page) to start the foggy programming stage. After completion of the MLC programming stage, the two bits of data (e.g., the two pages of data such as the lower page and middle page) can be read. As depicted in FIG. 8, NAND states 4, 6 and 12 are readable at the MLC programming stage.

In some aspects, the memory controller is tasked to provide the other two pages (e.g., upper page, top page) to start the fine programming stage (e.g., programming step 2). In this regard, for example, the RAM required per die in the MLC-fine programming mode may be 16 KB per plane*4 planes*2 pages*1 strings=128 KB, which is significantly lesser than the RAM required to perform the aforementioned foggy-fine programming. With the two bits of data programmed during the MLC programming stage (e.g., lower and middle pages) and the two bits of data provided at the start of the fine programming stage (e.g., upper and top pages), the memory controller can perform the fine programming stage with the four bits of data for QLC. As depicted in FIG. 8, NAND states 0-15 are provided at the fine programming stage.

In the MLC-fine programming mode, the memory controller can perform internal sense of the lower and middle pages in the NAND memory during the fine programming stage, after which the memory controller can initiate the fine programming operation. This approach can alleviate the RAM requirement for the storage system. However, there are many system-level scenarios where the lower and middle page data can be available within the storage system. When data is available prior to the start of the fine programming stage, the memory controller should not command the NAND memory to perform internal sensing for the data (e.g., lower and middle pages). In some aspects, the memory controller can read the lower and middle pages of data from a data cache. For example, the lower and middle page data can be available in DRAM when there may be sufficient space in DRAM for certain system handling scenarios, where the page data can be stored in DRAM for longer periods of time by delaying its release. In another example, the lower and middle page data may be stored in HMB, where NVMe host devices can provide optional data buffers when a storage device is connected to the HMB of a host device. In this regard, the storage device can have access to additional RAM capacity in the HMB to store the lower and middle pages. In another example, the lower and middle pages may be stored in an SLC block that are available when the data is moved from the SLC blocks to QLC blocks due to system-level scenarios. In such use cases where the lower and middle page data is available during the fine programming stage, it is beneficial for the storage device to acquire the lower and middle page data from a system-level storage location in lieu of the memory controller causing the NAND to perform an internal sense of this data.

The present disclosure of supplying lower and middle page data from a system-level storage location instead of an internal NAND sense operation during a fine programming stage provides several advantages over the legacy approaches in storage device programming. In some examples, acquiring the lower and middle page data from the system-level storage location achieves a faster sense time compared to the internal NAND sense. For example, NAND memory (e.g., 2-3-5-5 encoded QLC memory) may require five internal senses to obtain the lower and middle page data; however, if the page data is available in SLC blocks, then it may only take two internal NAND senses. Further, if the page data is available in volatile memory, such as in RAM, the faster toggle mode time would further reduce the latency in acquiring the page data. Additionally, page data supplied by either SLC block or DRAM would have a lesser BER compared to the internal page data sensed by the NAND during the fine programming stage.

Figure 9:
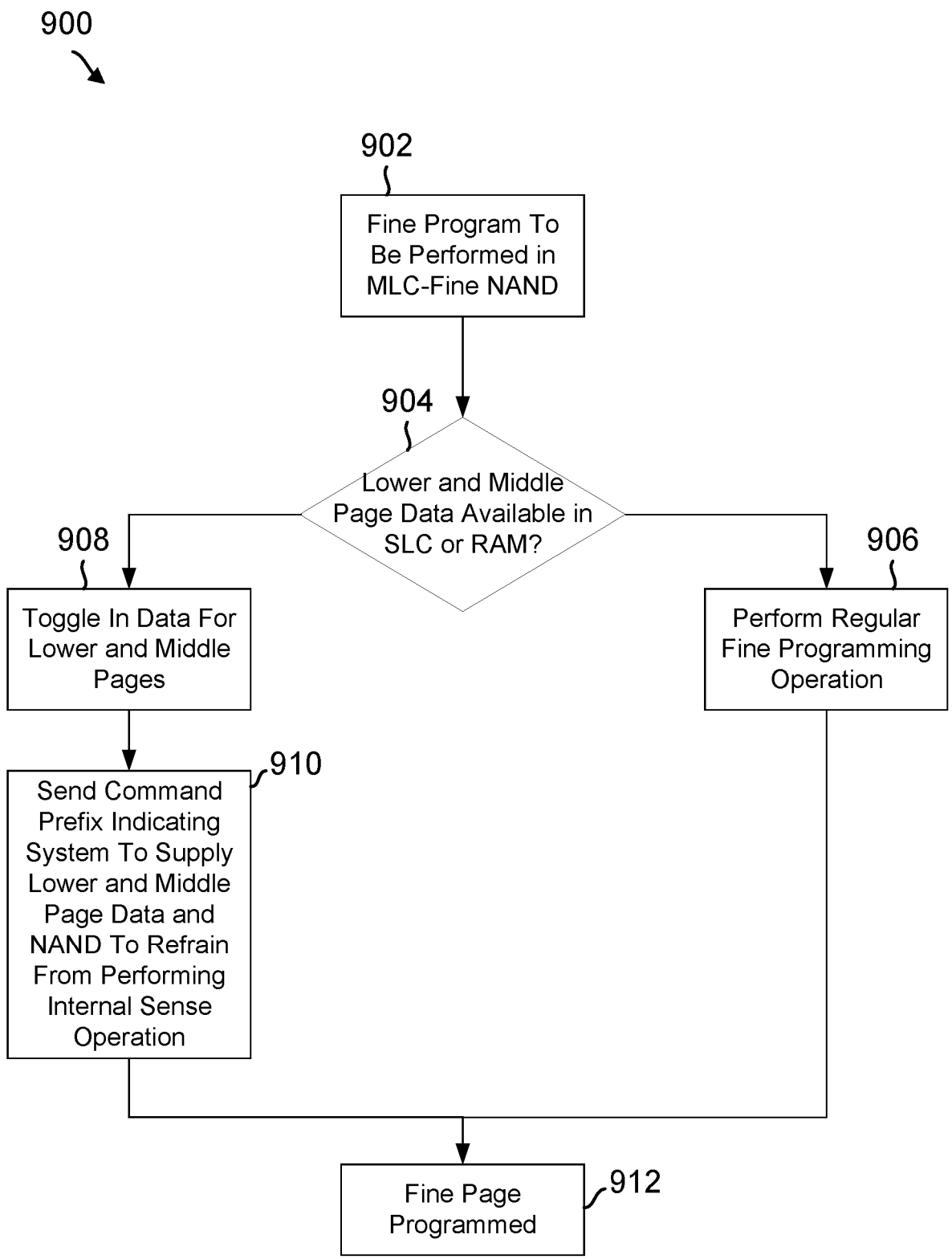
FIG. 9 is a flow chart illustrating an example process for selecting data from a system-level location or by internal sense for writing data to a block using a two-stage programming sequence, as performed by the storage device of FIG. 1.

FIG. 9 is a flow chart illustrating an example process 900 for selecting data from a system-level location or by internal sense for writing data to a block using a two-stage programming sequence, as performed by the storage device of FIG. 1. For example, the process 900 can be carried out in a storage device 102 such as the one illustrated in FIG. 1. Each of the steps in the flow chart can be controlled using a controller as described below (e.g. the memory controller 123), by a component or module of the controller, or by some other suitable means.

At 902, the controller initiates a fine programming stage to perform a fine programming operation in MLC-Fine NAND memory cells.

At 904, the controller determines whether lower page and middle page data are available in a system-level storage location. For example, the controller can determine whether the lower and middle page data is available in a SLC block. In another example, the controller can determine whether the lower and middle page data is available in volatile memory (e.g., RAM). If the controller determines that the lower and middle page data is available in either of the SLC block or RAM, then the process 900 proceeds to block 908. Otherwise, the process 900 proceeds to block 906.

At 906, when the controller has determined that the lower and middle page data is not available at either of the SLC block or RAM, then the controller may initiate a regular fine programming operation to be performed with the NAND memory cells. At the completion of 906, the process 900 may proceed to block 912.

At 908, when the controller has determined that the lower and middle page data is available at either of the SLC block or RAM, then the controller may initiate a toggle operation that toggles in data from either the SLC block or RAM for the lower and middle pages. For example, the controller may sense the lower and middle page data from the SLC block and toggle the sensed lower and middle page data to start the fine programming operation. In another example, the controller may read the lower and middle page data from RAM.

At 910, the controller can send a command prefix indicating that the lower and middle page data is to be supplied by the storage system (e.g., from system-level memory location) and the NAND to refrain from performing an internal sense operation for the lower and middle page data.

At 912, the controller performs the fine programming operation and the NAND memory cell is fine programmed.

Figure 10:
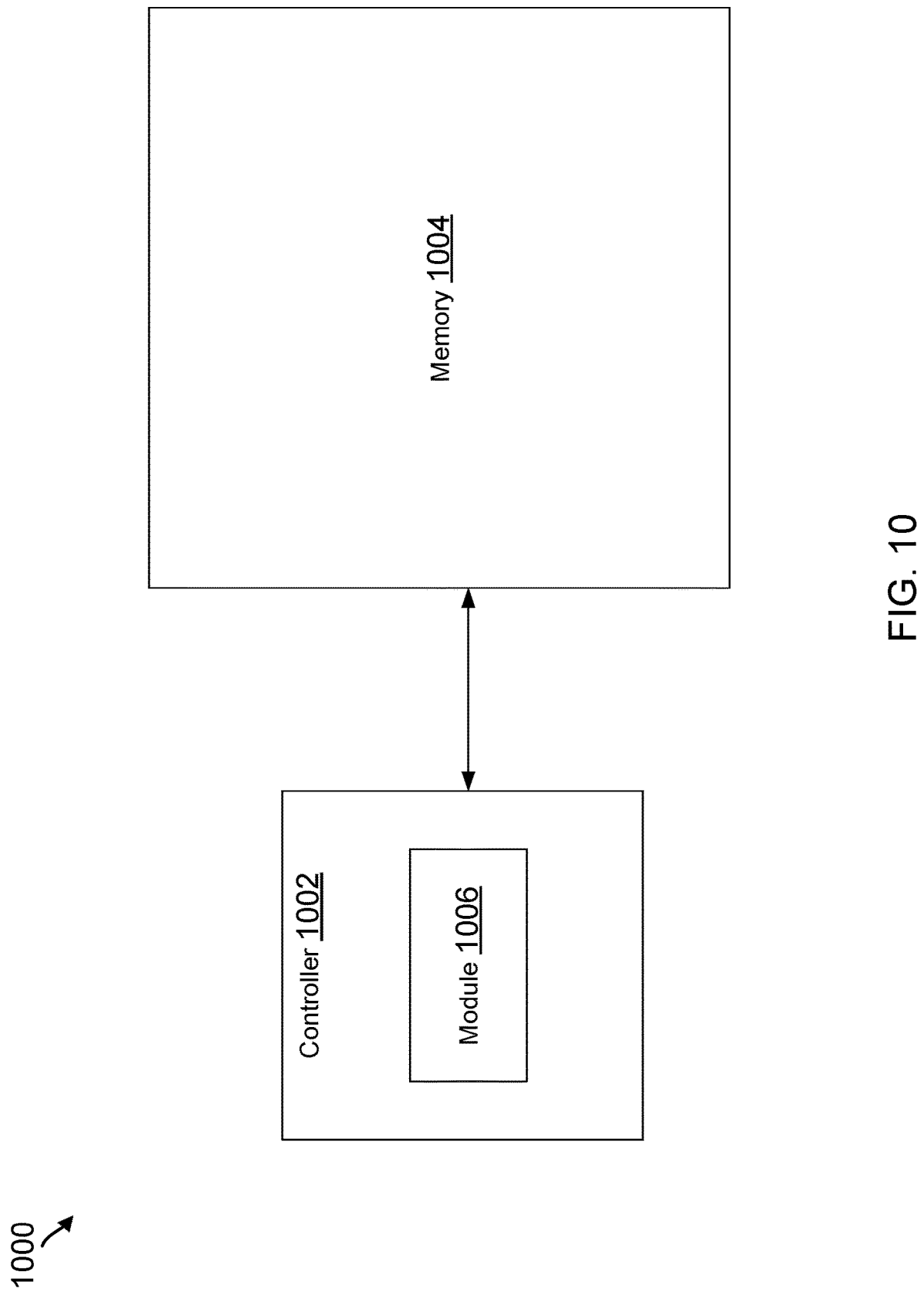
FIG. 10 is a conceptual diagram illustrating an example of a controller that writes data to a block using a two-stage programming sequence in the storage device of FIG. 1.

FIG. 10 is a conceptual diagram 1000 illustrating an example of a controller 1002 that writes data to a block using a two-stage programming sequence in the storage device 102 of FIG. 1. As illustrated in FIG. 10, a controller 1002 coupled to a memory 1004 in a storage device. For example, controller 1002 may correspond to controller 123 and memory 1004 may correspond to the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 1002 may include a module 1006 that may provide a means for determining whether first data is available at a system-level memory location during a first programming stage of a two-stage programming sequence. For example, the module 1006 may perform the aforementioned process described at 904. In one configuration, the module may be further configured to read the first data from the system-level memory location when the page data is available at the system-level memory location, e.g., as described in connection with 908. In one configuration, the module may be further configured to read the first data from the non-volatile memory when the page data is not available at the system-level memory location, e.g., as described in connection with 906. The controller 1002 may provide a means for performing a first programming operation associated with the first programming stage using the first data. For example, the module 1006 may perform the aforementioned process described at 912.

Accordingly, the controller described in the present disclosure improves memory utilization and programming performance of the storage device by selecting between system-supplied page and internally-sensed page data for performing a MLC-Fine programming sequence. For instance, the controller may determine whether lower and middle page data is available in the storage system (e.g., SLC, RAM, HMB). Otherwise, the controller causes the NAND memory to perform an internal sensing operation for the lower and middle page to start the fine programming operation. In this way, the controller may. Accordingly, the MLC-Fine programming sequence may be accomplished with minimal changes to controller logic and memory capacity requirements.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory including non-volatile memory and volatile memory; and
a controller configured to:
determine whether first data is available at a system-level memory location during a first programming stage of a two-stage programming sequence that corresponds to fine programming, wherein the first data is written to the memory with a second programming stage of the two-stage programming sequence that corresponds to foggy programming comprising a multi-level cell (MLC) write operation;
read the first data from the system-level memory location when the first data is available at the system-level memory location;
read the first data from the non-volatile memory when the first data is not available at the system-level memory location; and
perform a first programming operation associated with the first programming stage using the first data.

2. The storage device of claim 1, wherein the controller is configured to transition into the first programming stage from the second programming stage of the two-stage programming sequence.

3. The storage device of claim 2, wherein the second programming stage is initiated with two pages of data.

4. The storage device of claim 1, wherein the two-stage programming sequence includes a programming order that corresponds to a foggy-fine programming sequence.

5. The storage device of claim 1, wherein the controller is configured to start the first programming stage using the first data and second data.

6. The storage device of claim 5, wherein the first data comprises lower page data and middle page data and the second data comprises upper page data and top page data.

7. The storage device of claim 1, wherein the controller is configured to send an indication that the first data is being supplied from the system-level memory location and that the first data is not to be sensed internally from the non-volatile memory as part of the first programming operation.

8. The storage device of claim 7, wherein the indication comprises a command prefix that indicates a command to the non-volatile memory to refrain from performing an internal sense operation for the first data as part of the first programming operation.

9. The storage device of claim 1, wherein the system-level memory location corresponds to a memory location in a single-level cell (SLC) block of the non-volatile memory.

10. The storage device of claim 1, wherein the system-level memory location corresponds to a memory location in the volatile memory.

11. The storage device of claim 1, wherein the system-level memory location corresponds to a memory location in a host memory buffer at a host device.

12. A storage device, comprising:
a memory including non-volatile memory and volatile memory; and
a controller configured to:
transition into a first programming stage of a two-stage programming sequence that corresponds to fine programming from a second programming stage of the two-stage programming sequence that corresponds to foggy programming comprising a multi-level cell (MLC) write operation;
determine whether first data is available at a system-level memory location during the first programming stage;
read the first data from the system-level memory location when the first data is available at the system-level memory location;
read the first data from the non-volatile memory when the first data is not available at the system-level memory location; and
perform a first programming operation associated with the first programming stage using the first data.

13. The storage device of claim 12, wherein the controller is configured to send an indication that the first data is being supplied from the system-level memory location and that the first data is not to be sensed internally from the non-volatile memory as part of the first programming operation.

14. The storage device of claim 13, wherein the indication comprises a command prefix that indicates a command to the non-volatile memory to refrain from performing an internal sense operation for the first data as part of the first programming operation.

15. The storage device of claim 12, wherein the system-level memory location corresponds to a memory location in a single-level cell (SLC) block of the non-volatile memory.

16. The storage device of claim 12, wherein the system-level memory location corresponds to a memory location in the volatile memory.

17. The storage device of claim 12, wherein the system-level memory location corresponds to a memory location in a host memory buffer at a host device.

18. A storage device, comprising:
a memory including non-volatile memory and volatile memory; and
a controller configured to:
transition into a first programming stage of a two-stage programming sequence that corresponds to fine programming from a second programming stage of the two-stage programming sequence that corresponds to foggy programming comprising a multi-level cell (MLC) write operation;
determine whether first data is available at a system-level memory location during the first programming stage;
read the first data from the system-level memory location when the first data is available at the system-level memory location;
send an indication that the first data is being supplied from the system-level memory location as part of the first programming stage; and
perform a first programming operation associated with the first programming stage using the first data.

19. The storage device of claim 18, wherein the controller is configured to read the first data from the non-volatile memory when the first data is not available at the system-level memory location.

20. The storage device of claim 18, wherein the indication comprises a command prefix further that indicates a command to the non-volatile memory to refrain from performing an internal sense operation for the first data as part of the first programming stage.

* * * * *